(12) United States Patent
Svensson et al.

(10) Patent No.: US 8,807,471 B2
(45) Date of Patent: Aug. 19, 2014

(54) IAR DRAG RELEASE

(75) Inventors: Patrik Svensson, Asarum (SE); Peter Yaskowski, Spring City, PA (US)

(73) Assignee: Pure Fishing, Inc., Columbia, SC (US)

( * ) Notice: Subject to any disclaimer, the term of this patent is extended or adjusted under 35 U.S.C. 154(b) by 34 days.

(21) Appl. No.: 13/365,929

(22) Filed: Feb. 3, 2012

(65) Prior Publication Data

US 2013/0200194 A1    Aug. 8, 2013

(51) Int. Cl.
*A01K 89/02*    (2006.01)

(52) U.S. Cl.
USPC .......................................... 242/295; 242/321

(58) Field of Classification Search
USPC ......... 242/243–245, 250, 255, 257, 265, 266, 242/295, 302, 321
See application file for complete search history.

(56) References Cited

U.S. PATENT DOCUMENTS

| | | | |
|---|---|---|---|
| 4,142,694 A | 3/1979 | Rankin | |
| 5,556,049 A | 9/1996 | Bennett et al. | |
| 5,921,491 A * | 7/1999 | Kim .............................. | 242/268 |
| 6,286,772 B1 | 9/2001 | Koelewyn | |
| 6,318,655 B1 | 11/2001 | Henze | |
| 6,446,894 B1 | 9/2002 | Holma et al. | |
| 6,581,864 B1 | 6/2003 | Littau | |
| 6,830,208 B2 | 12/2004 | Datcuk | |
| 6,843,439 B1 | 1/2005 | Grice et al. | |
| 6,997,409 B1 | 2/2006 | Bledsoe et al. | |
| 7,226,013 B1 | 6/2007 | Kang | |
| 7,431,232 B1 | 10/2008 | Kang | |
| 7,806,355 B2 | 10/2010 | Gray et al. | |
| 7,832,673 B2 | 11/2010 | Lee et al. | |
| 2011/0042500 A1 | 2/2011 | Saito | |
| 2011/0209383 A1 | 9/2011 | Tennyson | |

FOREIGN PATENT DOCUMENTS

| | | |
|---|---|---|
| EP | 2425713 A2 | 3/2012 |
| JP | 2001269098 A | 10/2001 |
| WO | WO9402007 | 2/1994 |

* cited by examiner

*Primary Examiner* — Emmanuel M Marcelo
*Assistant Examiner* — Angela Caligiuri

(57) ABSTRACT

A fishing reel including: a housing with a side plate, a gear stud rotatably disposed relative to the housing to rotate about a first axis, and a main gear concentrically disposed relative to the gear stud. The main gear interacts with another gear to rotate a spool about a second axis. The reel also includes a drag stack concentrically disposed relative to the gear stud, a one way clutch concentrically disposed relative to the gear stud, and a clutch sleeve disposed within and engaging the one-way clutch. The clutch sleeve is constrained to rotate with the gear stud. The reel further includes an adjustment member disposed outside the housing that provides a user interface for adjusting a desired drag, and a drag adjuster that transmits drag adjustments from the adjustment member to the drag stack without axially displacing the clutch sleeve.

6 Claims, 11 Drawing Sheets

IAR DRAG RELEASE

BACKGROUND OF THE INVENTION

1. Field of the Invention

The present invention relates to fishing reels, and more particularly, to a fishing reel with an infinite anti-reverse (IAR) clutch.

2. Description of the Related Art

Conventional fishing reels include a drag brake for providing drag or resistance against rotation of the spool when line is being played out so that a fish is tired during the fishing process and therefore may eventually be reeled in and caught. Typically, and preferably, the level of drag provided is adjustable by the fisherman in the course of fishing so that a drag appropriate to circumstances may be obtained. For example, when a line is being played out a relatively low level of drag may be desirable to prevent the spool from getting ahead of the line and causing a tangling of the line. When a fish is hooked, a higher level of drag may be desired so as to allow the fish to run and tire, and that level of drag may be adjusted from time to time as the size of the fish is better estimated and/or as the fish tires.

One known drag arrangement includes a stack of washers of different materials, wherein the washers of one material are fixed in relation to the main gear and the washers of the other material are fixed in relation to the main gear shaft on which the main gear rotates, so that the torque required for relative rotation between the washers generates drag that can be adjusted by changing the axial load placed on the stack of washers. Typically, the washers are a mix of metal washers and fiber washers that exhibit friction when in contact with each other. An adjustment knob, such as a star wheel, is typically provided for adjusting the pressure applied to the stack of washers and therefore the drag level. U.S. Pat. No. 6,318,655 entitled "DRAG APPARATUS FOR CONVENTIONAL AND SPINNING REELS" describes a drag system of this type.

FIGS. 1-3 illustrate a related art star wheel, infinite anti-reverse (IAR) clutch fishing reel 10. As shown in FIG. 3, the reel 10 includes a left side plate 12, a frame 14, a spool 16, and a right side plate 18. On an exterior of the right side plate 18, the reel 10 includes a handle blank 20, with a counterbalance weight 22 and a handle knob 24 thereon, a tension washer 26, and an adjustment member 28, for example, a star wheel 28.

In the interior thereof, the reel 10 includes a click housing 30 and a detent spring 32 held by the click housing 30 to engage detents in the star wheel 28. This engagement creates a ratcheting action and a clicking sound upon rotation of the star wheel 28. The reel 10 also includes a pair of Belleville washers 34, a clutch sleeve 36 concentrically disposed within a one-way or IAR clutch 38, and a drag stack 40. The drag stack 40 includes at least one metal drag washer 42 and at least one fiber drag washer 44. Each fiber drag washer 44 is made of woven carbon fiber and includes a plurality of ears around the perimeter of thereof. An example of such a fiber drag washer 44 is shown in U.S. Pat. No. 6,318,655, which is incorporated herein by reference in its entirety.

The ears of the fiber drag washers 44 fit into corresponding recesses in a main gear 46. Thus the fiber drag washers 44 are constrained to rotate with the main gear 46. The reel 10 also includes a spacer washer 48, a spacer 50, a gear stud 52, a gear stud bearing retainer 54, and a gear stud bearing 56. The gear stud bearing retainer 54 retains the gear stud bearing 56 within the reel 10, and the gear stud 52 is connected to the gear stud bearing 56, for example, by a screw 58. Thus, the gear stud 52 is rotatably disposed about a first axis within the reel 10.

FIG. 2 illustrates that the spacer 50, the spacer washer 48, the main gear 46, the drag stack 40, the one-way clutch 38, the clutch sleeve 36, the Belleville washers 34, and the star wheel 28 are concentrically disposed relative to the gear stud 52. Although mounted on the gear stud bearing 56, because of the unidirectional rotation permitted by the one-way clutch 38, the gear stud 52 only rotates in a single (line in or retrieval) direction. Additionally, the spacer 50, the metal drag washers 42, and the clutch sleeve 36 are constrained to rotate with the gear stud 52. For example, as shown in FIG. 3, the spacer 50, the metal drag washers 42, and the clutch sleeve 36 are keyed to the gear stud 52. Thus, the metal drag washers 42 are constrained to rotate with the gear stud and the fiber drag washers 44 are constrained to rotate with the main gear 46.

The reel 10 additionally includes a pinion gear 62 (best shown in FIG. 2) that engages the main gear 46 and selectively engages the spool 16 by operation of an eccentric lever 64.

User rotation of the handle 20, which is connected to the gear stud 52, for example, by a nut 60, turns the gear stud 52. Thus, via the drag stack 40, the gear stud 52 turns the main gear 46, which, through the pinion 62, turns the spool 16 when the pinion 62 engages the spool 16.

To increase drag, the user tightens the star wheel 28, which compresses the Belleville washers 34, which transmit the force axially to the drag stack 40 via the clutch sleeve 36. This transmitted axial force compresses the fiber drag washers 44 of the drag stack 40.

The clutch sleeve 36 is used as a spacer to transmit the axial force between the star wheel 28 and the drag stack 40. Thus, the clutch sleeve acts as a drag adjuster. Additionally, the clutch sleeve also transmits rotational force (torque) applied as tension on a line wrapped on the spool 16. In other words, tension on the line is transferred to the spool 16, which is transferred to the pinion 62, to the main gear 46, to the fiber drag washers 44, to the metal drag washers 42, to the gear stud 52, to the clutch sleeve 36, to the one-way clutch 38. Under load (such as a large fish taking drag or snagged pulling on the line), the clutch sleeve 36 becomes "locked" to the gear stud 52 and the one-way clutch 38 due to friction. In this condition, the return force of the compressed fiber drag washers 44 is insufficient to overcome the friction and displace the clutch sleeve axially outward. Therefore, because of the rotational force (torque) fighting the axial movement, backing off the star wheel 28 in this condition does not decrease the drag force unless slack is applied to the line, thereby allowing the clutch sleeve 36 to release from the gear stud 52 and axially displace relative to the gear stud 52.

In other words, in general, because every force is balanced by an equal and opposite force, to adjust compression of the drag stack 40, the drag stack 40 must have force applied both on the axially inward side (right side as shown in FIG. 2) and the axially outward side (left side as shown in FIG. 2). For brevity, hereinafter, the axially inward and outward sides will be respectively referred to as the inward and outward sides. When force is applied to the drag stack by tightening the star wheel 28, the components of the drag stack compress slightly, resulting in relative movement between the inward side force-applying member and the outward side force-applying member. For the drag to release when the star wheel 28 is moved to reduce drag (i.e., backed off), the inward and outward side force-applying members need to displace relative to each other to allow the drag stack 40 to decompress. When the drag stack 40 decompresses, the force is reduced and the drag is lowered.

More specifically, in the reel 10, the inward side force is applied by the gear stud 52 and the outward side force is applied by the clutch sleeve 36, to which the gear stud is keyed. As a result of compression of the drag stack 40, the clutch sleeve 36 displaces relative to the gear stud 52 when drag is applied. The torque from the drag stack 40 is transmitted from the gear stud 52 to the clutch sleeve 36. The gear stud 52 cannot freely axially displace relative to the clutch sleeve 36 when this torque is transmitted due to friction. Thus, even if the star wheel 28 is moved to reduce drag, the drag cannot be reduced without first releasing the tension on the line, thereby allowing the clutch sleeve 36 to displace axially relative to the gear stud 52.

Known remedies fall short of complete incremental drag force during backing off of the star wheel 28. One such method includes smoothing the surface finish between the clutch sleeve 36 and the gear stud 52. Another method includes increasing the contact area between the clutch sleeve 36 and the gear stud 52, and allowing greater clearances between the mating parts. The goal of these methods is to decrease the friction between the clutch sleeve 36 and the gear stud 52, to allow the clutch sleeve to back off in direct relationship to movement of the star wheel. As previously noted, however, these methods fail to achieve their goal.

SUMMARY OF EMBODIMENTS OF THE INVENTION

Accordingly, it is an aspect of the present invention to provide a reel in which drag force can be incrementally reduced even under load.

The foregoing and/or other aspects of the present invention are achieved by providing a fishing reel, including: a housing with a side plate, a gear stud rotatably disposed relative to the housing to rotate about a first axis, and a main gear concentrically disposed relative to the gear stud. The main gear interacts with another gear to rotate a spool about a second axis. The reel also includes a drag stack concentrically disposed relative to the gear stud, a one way clutch concentrically disposed relative to the gear stud, and a clutch sleeve disposed within and engaging the one-way clutch. The clutch sleeve is constrained to rotate with the gear stud. The reel further includes an adjustment member disposed outside the housing that provides a user interface for adjusting a desired drag, and a drag adjuster that transmits drag adjustments from the adjustment member to the drag stack without axially displacing the clutch sleeve.

The foregoing and/or other aspects of the present invention are also achieved by providing a fishing reel, including: a housing with a side plate, a gear stud rotatably disposed relative to the housing to rotate about a first axis, and a main gear concentrically disposed relative to the gear stud. The main gear interacts with another gear to rotate a spool about a second axis. The reel also includes a drag stack concentrically disposed relative to the gear stud, a one way clutch concentrically disposed relative to the gear stud, and a clutch sleeve disposed within and engaging the one-way clutch. The clutch sleeve is constrained to rotate with the gear stud. The reel further includes an adjustment member disposed outside the housing that provides a user interface for adjusting a desired drag, and a drag adjuster that transmits drag adjustments from the adjustment member to the drag stack and displaces relative to the clutch sleeve to adjust compression of the drag stack.

The foregoing and/or other aspects of the present invention are also achieved by providing a fishing reel, including: a housing with a side plate, a gear stud rotatably disposed relative to the housing to rotate about a first axis, and a main gear concentrically disposed relative to the gear stud. The main gear interacts with another gear to rotate a spool about a second axis. The spool has a line thereon. The reel also includes a drag stack concentrically disposed relative to the gear stud, a one way clutch concentrically disposed relative to the gear stud, and a clutch sleeve disposed within and engaging the one-way clutch. The clutch sleeve is constrained to rotate with the gear stud. The reel further includes an adjustment member disposed outside the housing that provides a user interface for adjusting a desired drag, and a drag adjuster that, upon a drag-reducing adjustment on the adjustment member, axially displaces relative to the clutch sleeve to reduce compression of the drag stack while tension is applied to the line.

Additional and/or other aspects and advantages of the present invention will be set forth in the description that follows, or will be apparent from the description, or may be learned by practice of the invention.

BRIEF DESCRIPTION OF THE DRAWINGS

The above and/or other aspects and advantages of embodiments of the invention will become apparent and more readily appreciated from the following detailed description, taken in conjunction with the accompanying drawings, of which.

DETAILED DESCRIPTION OF EMBODIMENTS OF THE PRESENT INVENTION

Figure 1:
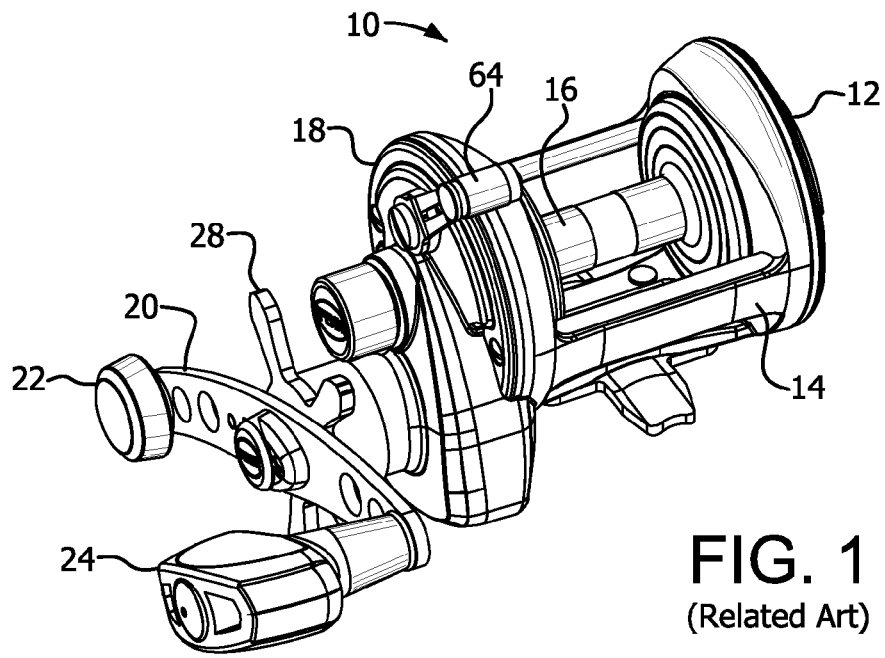
FIG. 1 is a perspective view of a related art reel.
Figure 2:
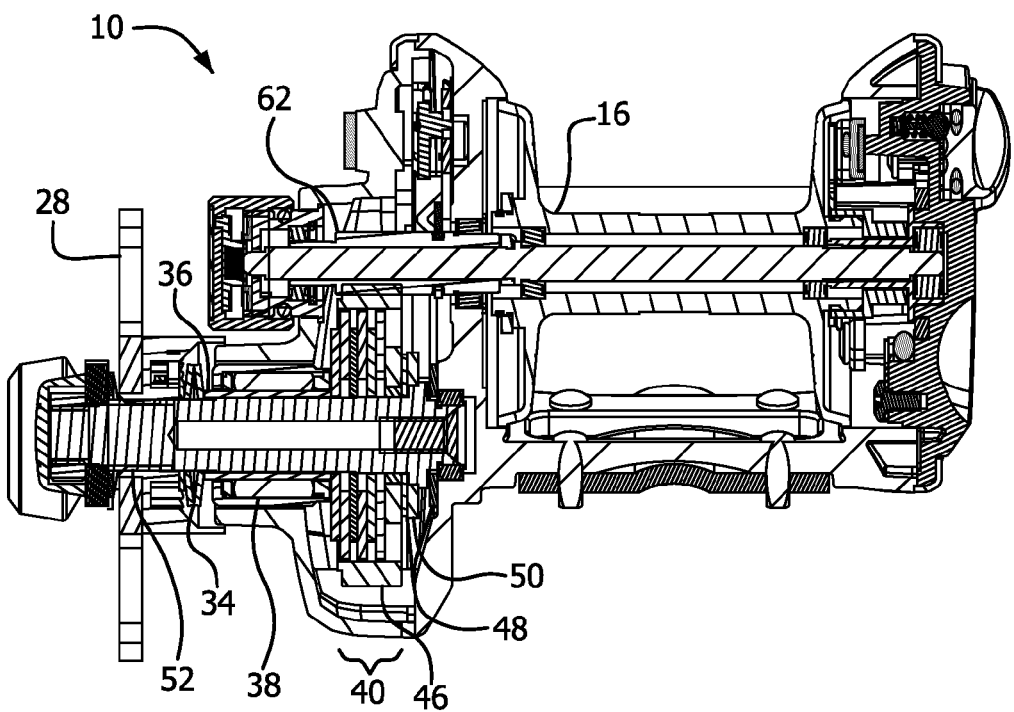
FIG. 2 is a cross-sectional view of the reel of FIG. 1.
Figure 3:
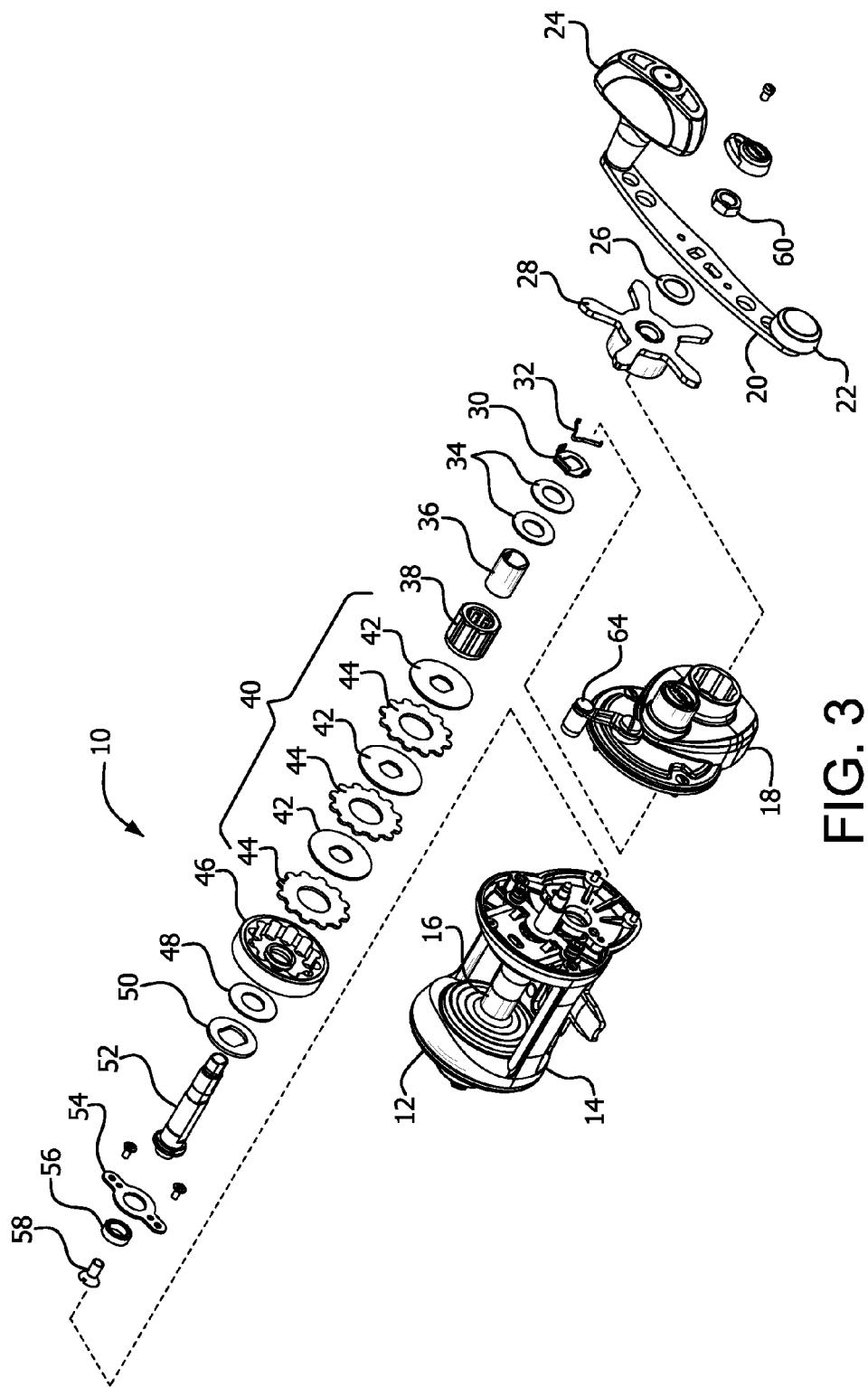
FIG. 3 is an exploded view of the reel of FIG. 1.

Reference will now be made in detail to embodiments of the present invention, which are illustrated in the accompanying drawings, wherein like reference numerals refer to like elements throughout. The embodiments described herein exemplify, but do not limit, the present invention by referring to the drawings. As will be understood by one skilled in the art, terms such as left, right, inner, outer, up, down, bottom, and top are relative, and are employed to aid illustration, but are not limiting.

Figure 4:
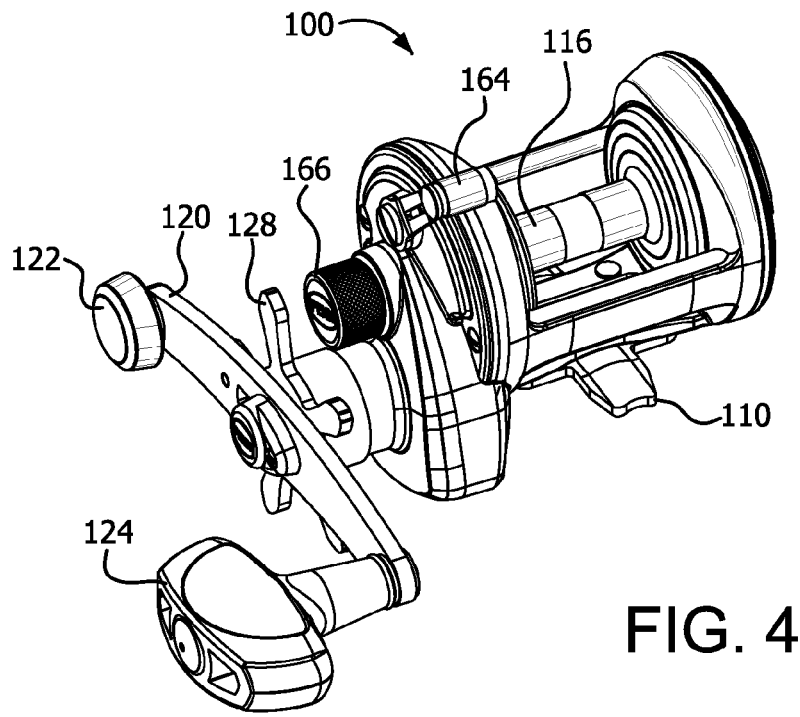
FIG. 4 is a perspective view of a reel in accordance with an embodiment of the present invention.
Figure 5:
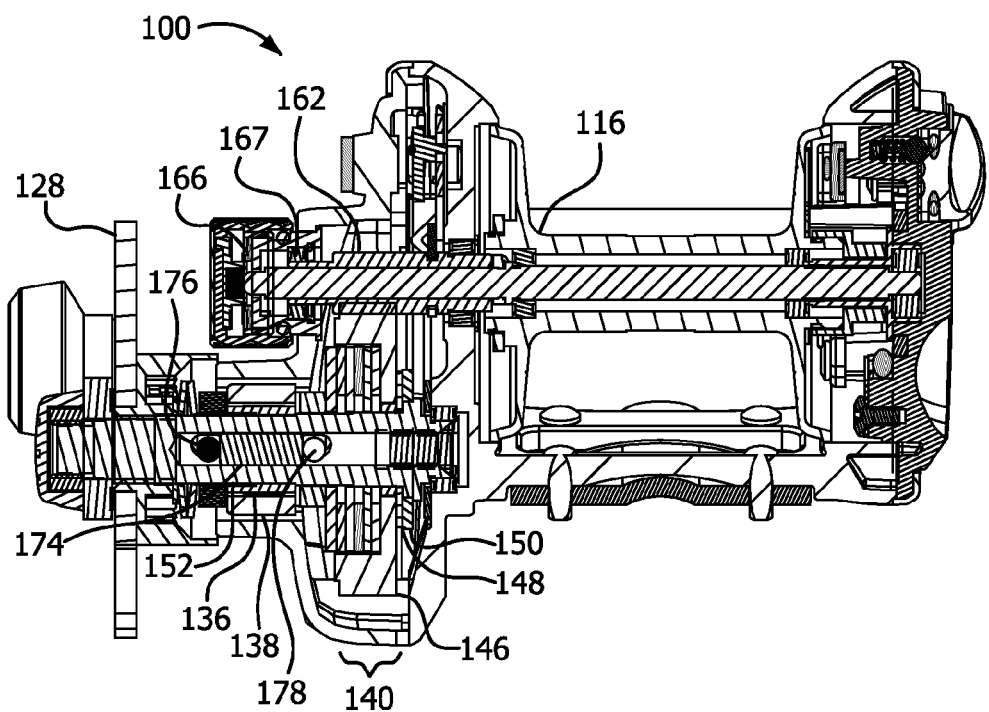
FIG. 5 is a cross-sectional view of the reel of FIG. 4.
Figure 6:
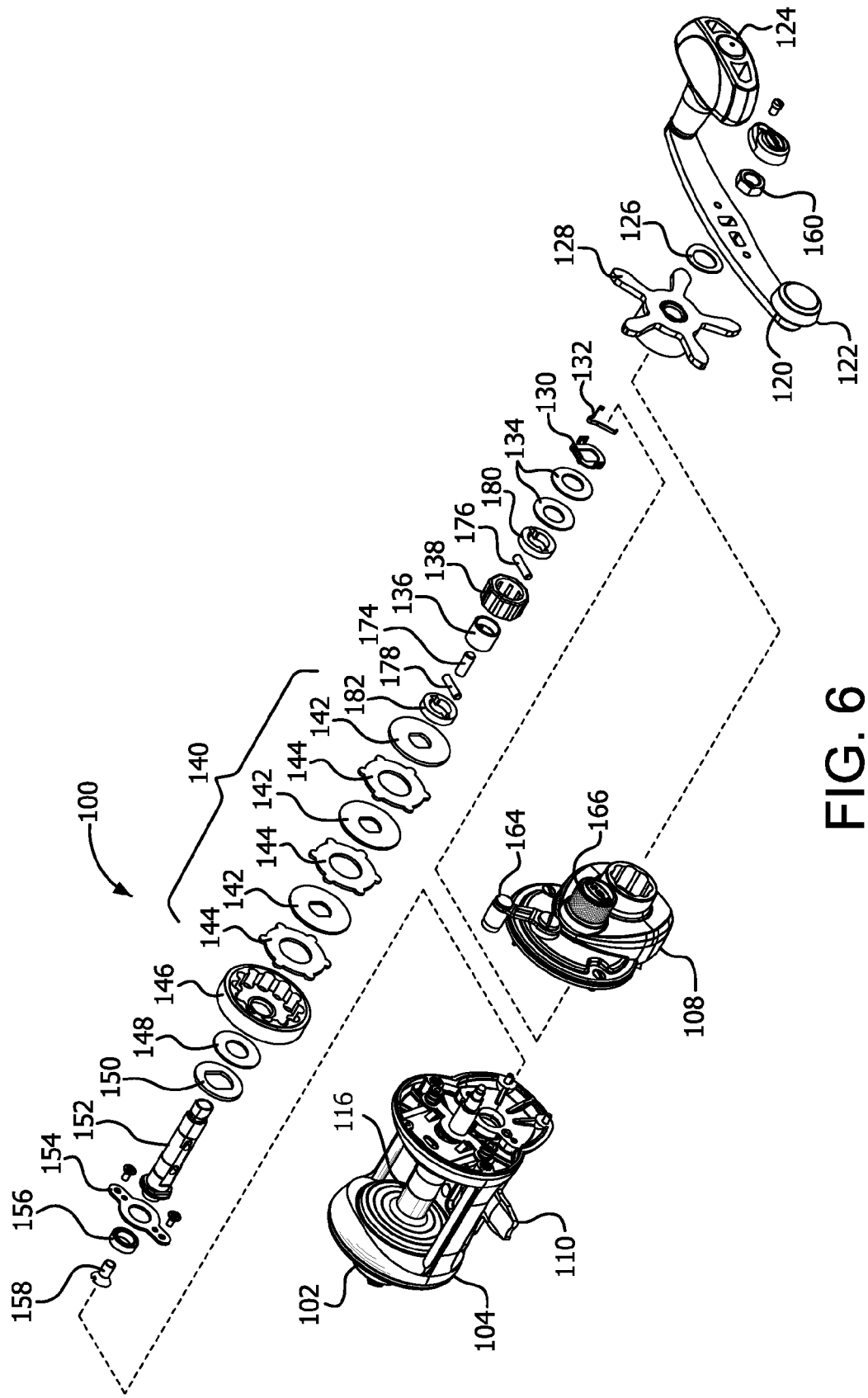
FIG. 6 is an exploded view of the reel of FIG. 4.

FIGS. 4-6 illustrate a star wheel, infinite anti-reverse (IAR) clutch fishing reel 100 in accordance with an embodiment of the present invention. As shown in FIG. 6, the reel 100 includes a left side plate 102, a frame 104, a spool 116, a right side plate 108, and a stand 110 for attaching the reel 100 to a rod or other device. On an exterior of the right side plate 108, the reel 100 includes a handle blank 120, with a counterbalance weight 122 and a handle knob 124 thereon, a tension washer 126, and an adjustment member 128, for example, a star wheel 128.

In an interior thereof, the reel 100 includes a click housing 130, a detent spring 132, a pair of Belleville washers 134, a clutch sleeve 136 concentrically disposed within a one-way or IAR clutch 138, and a drag stack 140. The drag stack 140 includes at least one metal drag washer 142 and at least one fiber drag washer 144.

The ears of the fiber drag washers 144 fit into corresponding recesses in a main gear 146. Thus the fiber drag washers 144 are constrained to rotate with the main gear 146. The reel 100 also includes a spacer washer 148, a spacer 150, a gear stud bearing retainer 154, and a gear stud bearing 156. The gear stud bearing retainer 154 retains the gear stud bearing 156 within the reel 100.

The reel 100 additionally includes a gear stud 152 that is connected to the gear stud bearing 156, for example, by a screw 158. Thus, the gear stud 152 is rotatably disposed about a first axis within the reel 100.

FIG. 5 illustrates that the spacer 150, the spacer washer 148, the main gear 146, the drag stack 140, the one-way clutch 138, the clutch sleeve 136, the Belleville washers 134, and the star wheel 128 are concentrically disposed relative to the gear stud 152. Although mounted on the gear stud bearing 156, because of the unidirectional rotation permitted by the one-way clutch 138, the gear stud 152 only rotates in a single (line in or retrieval) direction. Additionally, the spacer 150, the metal drag washers 142, and the clutch sleeve 136 are constrained to rotate with the gear stud 152. For example, as shown in FIG. 6, the spacer 150, the metal drag washers 142, and the clutch sleeve 136 are keyed to the gear stud 152. Thus, the metal drag washers 142 are constrained to rotate with the gear stud 152 and the fiber drag washers 144 are constrained to rotate with the main gear 146.

The reel 100 additionally includes a pinion gear 162 (best shown in FIG. 5) that engages the main gear 146 and selectively engages the spool 116 by operation of an eccentric lever 164. Further, the reel 100 includes a preset knob 166, which adjusts clearance of spool bearings 167, via which the spool 116 rotates about a second axis within the reel 100.

User rotation of the handle 120, which is connected to the gear stud 152, for example, by a nut 160, turns the gear stud 152. Thus, via the drag stack 140, the gear stud 152 turns the main gear 146, which, through the pinion 162, turns the spool 116 when the pinion 162 engages the spool 116.

Figure 7:
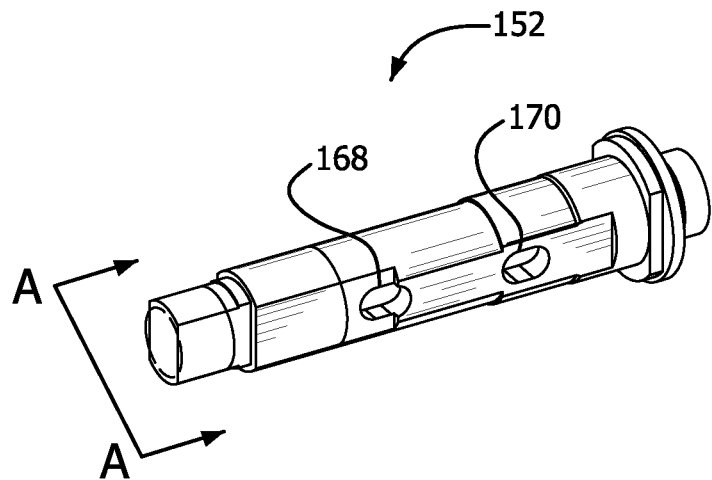
FIG. 7 is a perspective view of a gear stud of the reel of FIG. 4.
Figure 8:
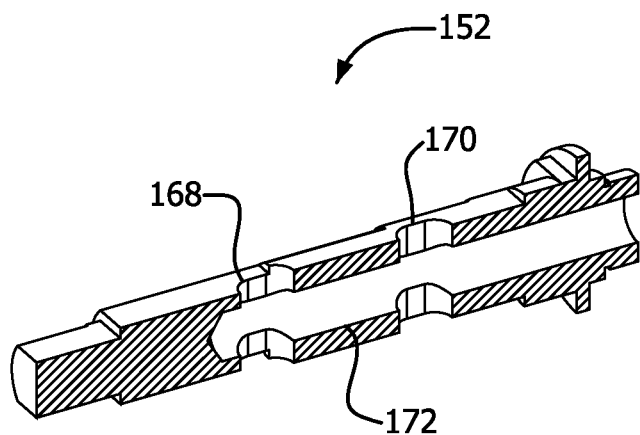
FIG. 8 is a perspective cross-sectional view of the gear stud of FIG. 7 taken along line A-A.

FIG. 7 is a perspective view of a gear stud 152 and FIG. 8 is a cross-sectional view of the gear stud 152 taken along line A-A in FIG. 7. As shown in FIGS. 7 and 8, the gear stud 152 includes a pair of axially-elongated lateral through holes 168 and 170 and an axial cavity 172 that connects the lateral through holes 168 and 170. Referring back to FIG. 6, the reel 100 also comprises a drag adjuster that includes an axial pin 174 and a pair of radial or cross pins 176 and 178. The axial or inner pin 174 is disposed within the axial cavity 172 and the radial pins 176 and 178 are respectively disposed in the lateral through holes 168 and 170 at the axial ends of the axial pin 174. The reel 100 additionally includes a pair of circumferential pin housings 180 and 182 that respectively maintain the pair of radial pins 176 and 178 within the gear stud 152.

To increase drag, the user tightens the star wheel 128, and the axial force is transferred through the Belleville washers 134 to the axially outermost, or first radial pin 176. The first radial pin 176 transfers the axial force to the axial pin 174, which transfers the axial force to the axially innermost, or second radial pin 178, which in turn transfers the axial force to the drag stack 140. The elongation of the lateral through holes 168 and 170 permits the axial displacement of the axial and radial pins 174, 176, and 178.

Because of clearance between the axial ends of the clutch sleeve 136 and the first and second radial pins 176 and 178, the clutch sleeve cannot carry an axial load from the star wheel 128. Thus, the opposing axial forces of the star wheel 128 and the expansion of the drag stack 140 are transmitted through the axial pin 174 and the first and second radial pins 176 and 178, and not the clutch sleeve 136. Therefore, loosening and tightening the star wheel 128 adjusts the drag force from the drag stack 140, even when the clutch sleeve 136 is under rotational load. In other words, the drag adjuster transmits drag adjustments from the star wheel 128 to the drag stack 140 and displaces relative to the clutch sleeve 136 to adjust compression of the drag stack 140.

Put another way, the inward side force is applied by the gear stud 152 (which is keyed to the clutch sleeve 136), and the outward force is applied by the pins 174, 176, and 178. As a result of compression of the drag stack 140, the pins 174, 176, and 178 axially displace relative to the gear stud 152 when drag is applied. The torque from the drag stack 140 is transmitted from the gear stud 152 to the clutch sleeve 136. And because no torque is transmitted between the pins 174, 176, and 178 and the gear stud 152, the pins 174, 176, and 178 can freely axially displace relative to the gear stud 152. Therefore, upon a drag-reducing adjustment on the star wheel 128, the drag adjuster axially displaces relative to the clutch sleeve 136 to reduce compression of the drag stack 140, and thus, reduce drag, even while tension is applied to the line.

Figure 9:
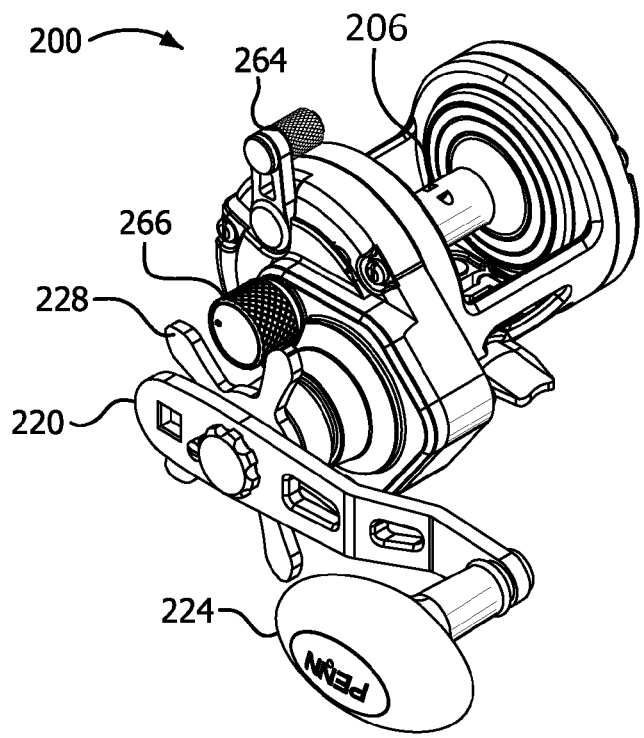
FIG. 9 is a perspective view of a reel in accordance with another embodiment of the present invention.
Figure 10:
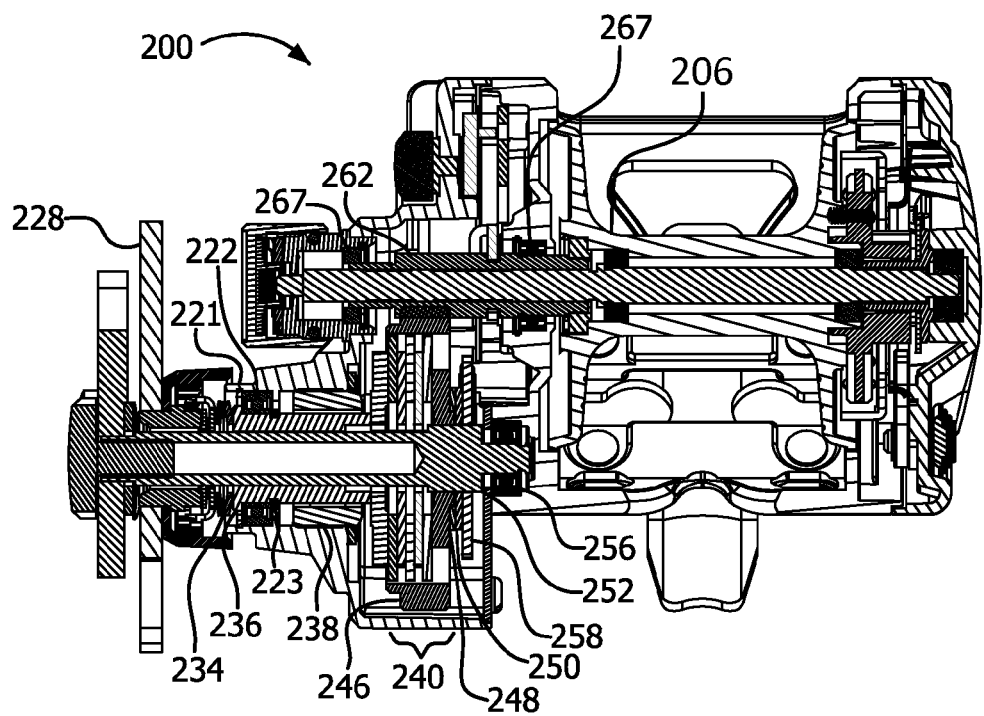
FIG. 10 is a cross-sectional view of the reel of FIG. 9.
Figure 11:
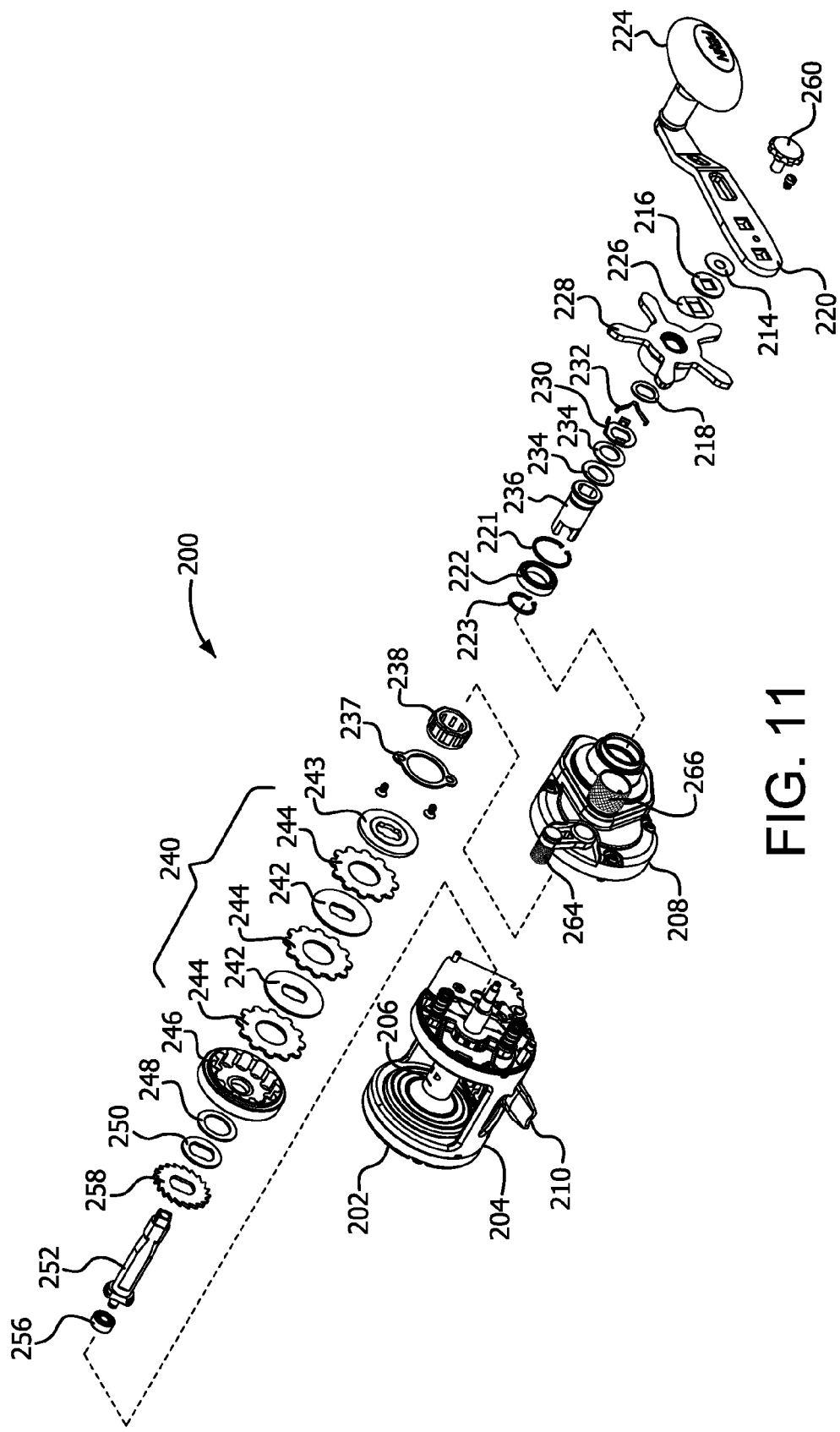
FIG. 11 is an exploded view of the reel of FIG. 9.

FIGS. 9-11 illustrate a star wheel, infinite anti-reverse (IAR) clutch fishing reel 200 in accordance with another embodiment of the present invention. As shown in FIG. 11, the reel 200 includes a left side plate 202, a frame 204, a spool 206, a right side plate 208, and a stand 210 for attaching the reel 200 to a rod or other device. On an exterior of the right side plate 208, the reel 200 includes a handle blank 220 with a handle knob 224 thereon, a spacer washer 214, a handle washer 216, a tension washer 226, and an adjustment member 228, for example, a star wheel 228.

In an interior thereof, the reel 200 includes a click housing 230, a detent spring 232, a spacer 218, a pair of Belleville washers 234, a clutch sleeve 236 concentrically disposed within a one-way or IAR clutch 238, a bearing retaining clip 221, a bearing 222, for example, a ball bearing 222, a clutch sleeve retaining clip 223, and a drag stack 240. The bearing retaining clip 221 holds the bearing 222 to the right side plate 208 and the clutch sleeve retaining clip 223 holds the clutch sleeve 236 to the bearing 222. Additionally, a clutch retainer 237 that retains the clutch 238 to the inside of the right side plate 208. The drag stack 240 includes at least one metal drag washer 242 and at least one fiber drag washer 244. According to one embodiment, the reel includes a plurality of metal drag washers 242 and a corresponding plurality of fiber drag washers. Further, according to one embodiment, the axially outermost metal drag washer 242 is thicker than the remaining metal drag washers 242 and is a drive plate 243.

The ears of the fiber drag washers 244 fit into corresponding recesses in a main gear 246. Thus the fiber drag washers 244 are constrained to rotate with the main gear 246. The reel 200 also includes a spacer washer 248, a spacer 250, a ratchet 258 and a gear stud bearing 256. The ratchet 258, in conjunction with a pawl (not shown) serves as a backup anti-reverse mechanism in case the clutch 238 fails.

The reel 200 additionally includes a gear stud 252 that is connected to the gear stud bearing 256, for example, by a screw (not shown). Thus, the gear stud 252 is rotatably disposed about a first axis within the reel 200.

FIG. 10 illustrates that the ratchet 258, the spacer 250, the spacer washer 248, the main gear 246, the drag stack 240, the one-way clutch 238, the clutch sleeve 236, the Belleville washers 234, and the star wheel 228 are concentrically disposed relative to the gear stud 252. Although mounted on the gear stud bearing 256, because of the unidirectional rotation permitted by the one-way clutch 238, the gear stud 252 only rotates in a single (line in or retrieval) direction. Additionally, the ratchet 258, the spacer 250, the metal drag washers 242, and the clutch sleeve 236 are constrained to rotate with the gear stud 252. For example, as shown in FIG. 11, the ratchet 258, the spacer 250, and the clutch sleeve 236 are keyed to the gear stud 252, and the metal drag washers 242 are keyed to the clutch sleeve 236. Thus, the metal drag washers 242 are constrained to rotate with the gear stud 252 and the fiber drag washers 244 are constrained to rotate with the main gear 246.

The reel 200 additionally includes a pinion gear 262 (best shown in FIG. 10) that engages the main gear 246 and selectively engages the spool 206 by operation of an eccentric lever 264. Further, the reel 200 includes a preset knob 266, which adjusts clearance of spool bearings 267, via which the spool 206 rotates about a second axis within the reel 200.

User rotation of the handle 220, which is connected to the gear stud 252, for example, by a nut 260, turns the gear stud 252. Thus, via the drag stack 240, the gear stud 252 turns the main gear 246, which, through the pinion 262, turns the spool 206 when the pinion 262 engages the spool 206.

Figure 12:
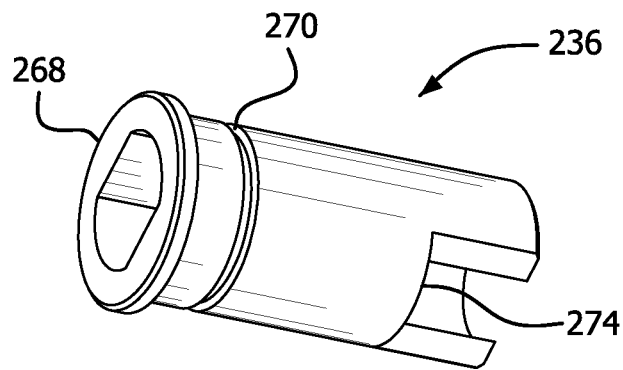
FIG. 12 is a perspective view of a clutch sleeve of the reel of FIG. 9.

FIG. 12 is a perspective view of the clutch sleeve 236, which has a shoulder 268 at its axially outer end. The ball bearing 222 is retained in a pocket of the right side plate 208 by the bearing retaining clip 221. The clutch sleeve 236 is held against the ball bearing 222 by the clutch sleeve retaining clip 223, which engages a circumferential groove 270 of the clutch sleeve 236. Therefore, the clutch sleeve 236 and the ball bearing 222 are axially fixed relative to the right side plate 208. In other words, the clutch sleeve 236 is not free to move axially relative to the right side plate 208.

Figure 13:
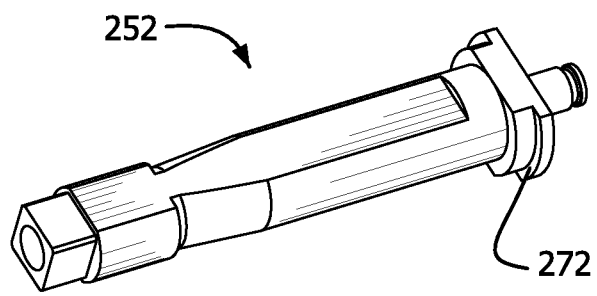
FIG. 13 is a perspective view of a gear stud of the reel of FIG. 9.

FIG. 13 is a perspective view of a gear stud 252, which is threaded into the star wheel 228. The reel 200 includes a drag adjuster 272, which, as shown in FIG. 13, comprises a shoulder 272 of the gear stud 252 that is disposed at an axially inner end of the gear stud 252. When the star wheel 228 is tightened, the gear stud 252 is pulled axially outward. During this motion, the drag adjuster 272 transfers force to the ratchet 258 and its adjacent washers 250, 248, pushing them axially outward to move the main gear 246 axially outward against the drag stack 240. As noted previously, the main gear 246 is keyed to the fiber drag washers 244 of the drag stack 240. The axially outermost metal drag washer (i.e., the drive plate) 242 of the drag stack 240 bears on an axially inner shoulder 274 of the clutch sleeve 236 (see FIG. 12), and because the clutch sleeve 236 is axially fixed, tightening the star wheel 228 compresses the drag stack 240 via the axial displacement of the gear stud 252.

The clutch sleeve 236 is keyed internally to gear stud 252 and the metal drag washers 242 of the drag stack 240 are keyed to the clutch sleeve 236 rather than being keyed to the gear stud 252. The gear stud 252 and the clutch sleeve 236 are rotationally fixed together, but the gear stud 252 can move axially relative to the clutch sleeve 236.

The braking force on the main gear 246 is mainly applied through the drag stack 240, but some friction is also applied via the ratchet 258 and its adjacent washers 250, 248. Because of this, rotation of the main gear 246 will also rotate the gear stud 252. But the gear stud 252 is not directly carrying the rotational load, and can therefore move more freely. That is, the small amount of friction between the spacer washer 248 and the main gear 246 is not enough to prevent axial displacement of the gear stud 252 when tightening or loosening the star wheel 228.

Thus, the clutch sleeve 236 does not have to move axially to relieve drag forces. In fact, as noted previously, when assembled, the clutch sleeve 236 is axially fixed relative to the right side plate 208. Because the gear stud 252 is not loaded with torque, the gear stud 252 moves axially relative to the clutch sleeve 236 to relieve pressure on the drag stack 240. As the star wheel 228 is released, the fiber drag washers 244 decompress and force the gear stud 252 axially inward. Therefore, loosening and tightening the star wheel 228 adjusts the drag force from the drag stack 240, even when the clutch sleeve 236 is under rotational load. In other words, the drag adjuster transmits drag adjustments from the star wheel 228 to the drag stack 240 and displaces relative to the clutch sleeve 236 to adjust compression of the drag stack 240. Put another way, the inward side force is applied by the gear stud 252 (which is keyed to the clutch sleeve 236), and the outward force is applied by the clutch sleeve 236. As a result of compression of the drag stack 240, the gear stud 252 axially displaces relative to the clutch sleeve 236 when drag is applied. The torque from the drag stack 240 is transmitted directly to the clutch sleeve 236. And because no torque is transmitted between the clutch sleeve 236 and the gear stud 252, the gear stud 252 can freely axially displace relative to the clutch sleeve 236, which is axially fixed. Therefore, upon a drag-reducing adjustment on the star wheel 228, the drag adjuster axially displaces relative to the clutch sleeve 236 to reduce compression of the drag stack 240, and thus, reduce drag, even while tension is applied to the line.

Figure 14:
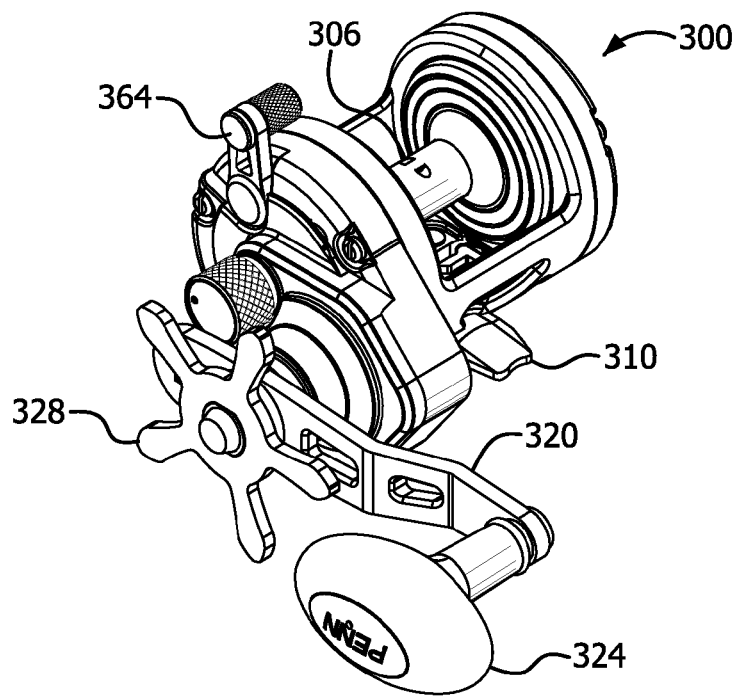
FIG. 14 is a perspective view of a reel in accordance with another embodiment of the present invention.
Figure 15:
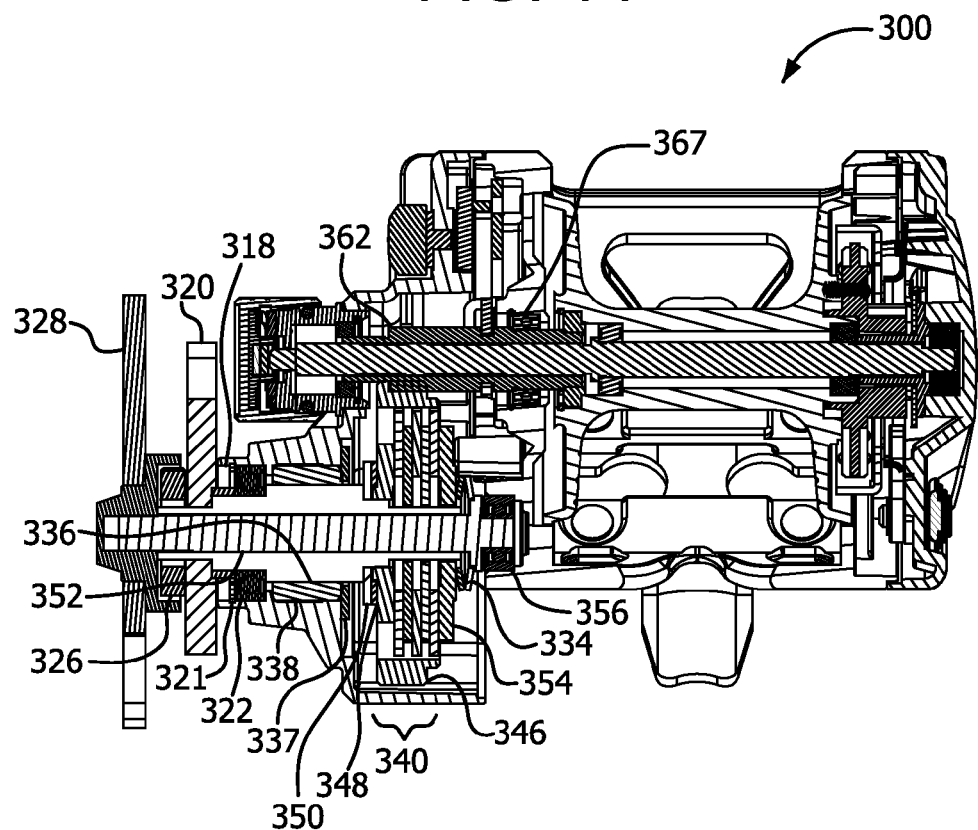
FIG. 15 is a cross-sectional view of the reel of FIG. 14.
Figure 16:
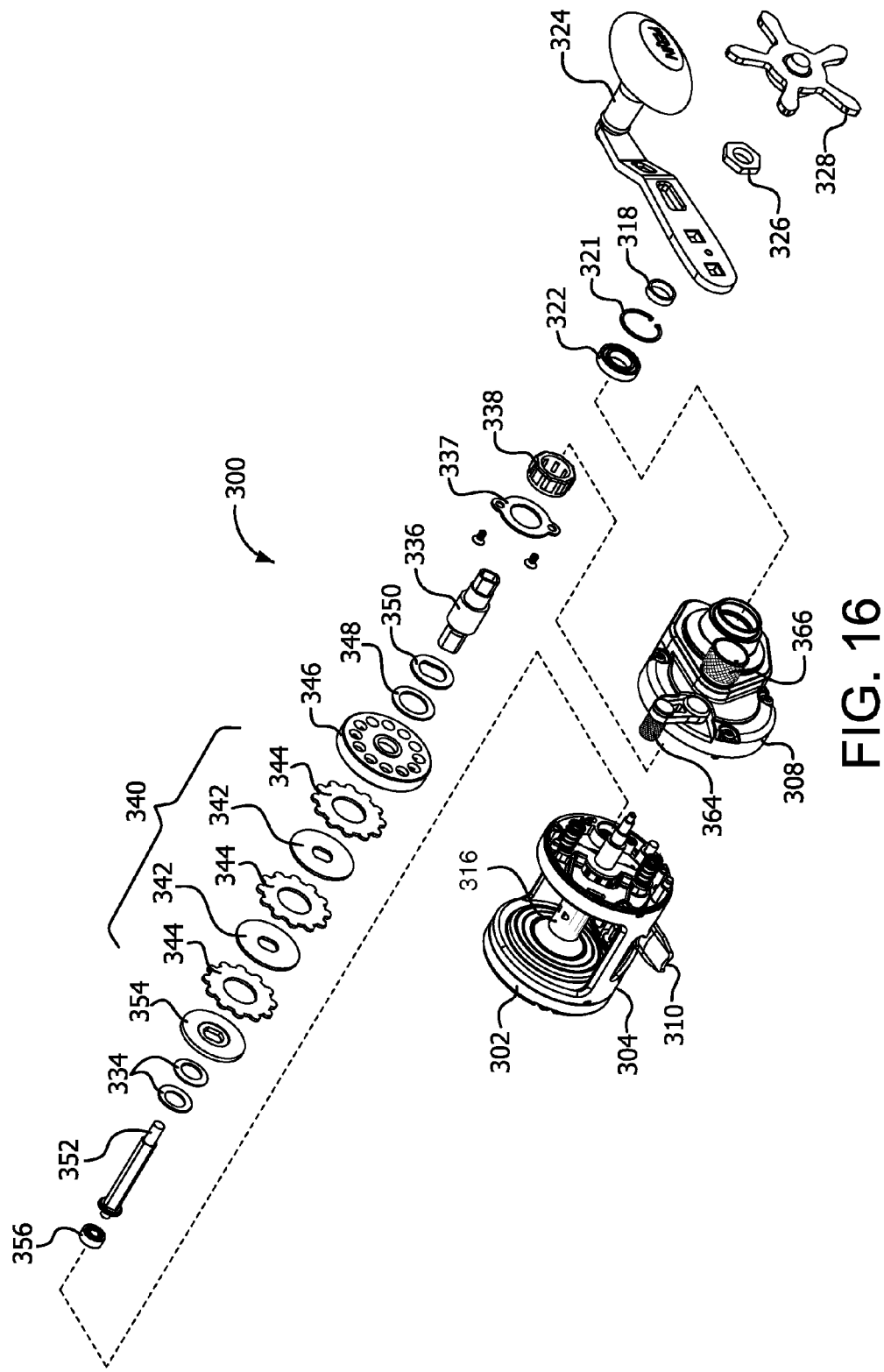
FIG. 16 is an exploded view of the reel of FIG. 14.

FIGS. 14-16 illustrate a star wheel, infinite anti-reverse (IAR) clutch fishing reel 300 in accordance with another embodiment of the present invention. As shown in FIG. 16, the reel 300 includes a left side plate 302, a frame 304, a spool 316, a right side plate 308, and a stand 310 for attaching the reel 300 to a rod or other device. On an exterior of the right side plate 308, the reel 300 includes a handle blank 320 and a handle knob 324 thereon, a handle nut 326, and an adjustment member 328, for example, a star wheel 328, which is disposed axially outward relative to the handle blank 320.

As shown in FIGS. 15 and 16, a bearing 322, for example, a ball bearing 322, is fixed to the right side plate 308 by a bearing retainer 321 and a shoulder of the right side plate 308. Additionally, a clutch retainer 337 axially retains a one way or IAR clutch 338 relative to the right side plate 308.

Figure 17:
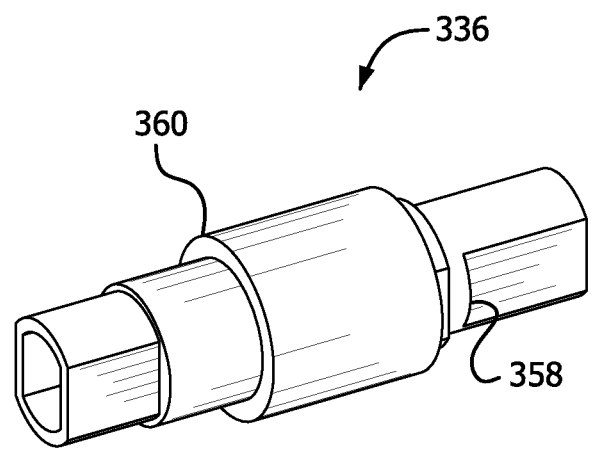
FIG. 17 is a perspective view of a gear stud/clutch sleeve of the reel of FIG. 14.

In this embodiment, the gear stud and the clutch sleeve are integrally formed as a unitary construction (gear stud/clutch sleeve 336), which is keyed to the handle blank 320 at the axially outward end thereof. As shown in FIG. 17, the gear stud/clutch sleeve 336 includes a central portion 360. This central portion 360 is disposed within the one-way clutch 338 to limit rotation of the gear stud/clutch sleeve 336 to a single (line in or retrieval) direction.

Referring back to FIGS. 15 and 16, the reel 300 also includes a spacer 350, a spacer washer 348, a main gear 346, a drag stack 340, a drive plate 354, a pair of Belleville washers 334, and a drag shaft bearing 356. The reel further includes drag adjuster comprising a drag shaft 352. The drag shaft 352 is connected to the drag shaft bearing 356, for example, by a screw (not shown). Thus, the drag shaft 352 is rotatably disposed about a first axis within the reel 300. The drag stack 340 includes at least one metal drag washer 342 and at least one fiber drag washer 344. The ears of the fiber drag washers 344 fit into corresponding recesses in a main gear 346. Thus the fiber drag washers 344 are constrained to rotate with the main gear 346.

FIG. 15 illustrates that the spacer 350, the spacer washer 348, the main gear 346, the drag stack 340, the one-way clutch 338, the Belleville washers 334, and the star wheel 328 are concentrically disposed relative to the gear stud/clutch sleeve 336 and the drag shaft 352. Additionally, the spacer 350, the metal drag washers 342, the drive plate 354 and the handle blank 320 are constrained to rotate with the gear stud/clutch sleeve 336. For example, as shown in FIG. 16, the spacer 350, the metal drag washers 342, and the drive plate 354 are keyed to the gear stud/clutch sleeve 336 at the axially inward end thereof and the handle blank 320 is keyed to the axially outward end thereof. Thus, the metal drag washers 342 are constrained to rotate with the gear stud/clutch sleeve 336 and the fiber drag washers 344 are constrained to rotate with the main gear 346. Further, the handle nut 326 axially locks the handle blank 320, a spacer 318, and the clutch sleeve/gear stud 336 to the ball bearing 322. Thus, when installed, the gear stud/clutch sleeve 336 is axially fixed.

The reel 300 additionally includes a pinion gear 362 (best shown in FIG. 15) that engages the main gear 346 and selectively engages the spool 316 by operation of an eccentric lever 364. Further, the reel 300 includes a preset knob 366, which adjusts clearance of spool bearings 367, via which the spool 316 rotates about a second axis within the reel 300.

User rotation of the handle 320, which is keyed to the gear stud/clutch sleeve 336, turns the gear stud/clutch sleeve 336. Thus, via the drag stack 340, the gear stud/clutch sleeve 336 turns the main gear 346, which, through the pinion 362, turns the spool 316 when the pinion 362 engages the spool 316.

Figure 18:
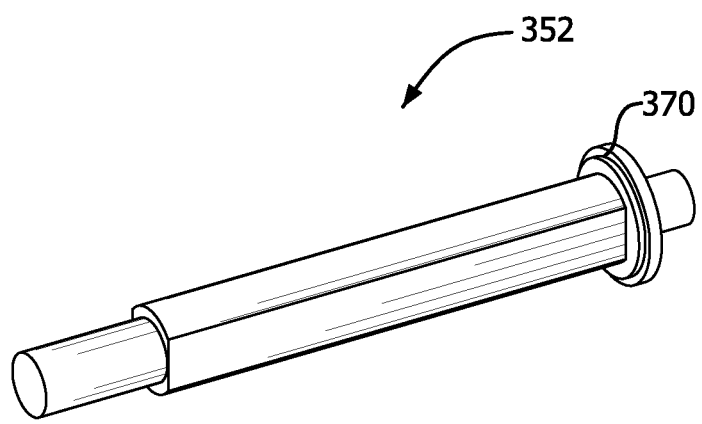
FIG. 18 is a perspective view of a drag shaft of the reel of FIG. 14.

The drag shaft 352 is threaded on an axially outward end to connect with the star wheel 328. Additionally, as shown in FIGS. 15, 16, and 18, the drag shaft 352 is keyed to the clutch sleeve/gear stud 336. In other words, the drag shaft 352 is constrained to rotate with the clutch sleeve/gear stud 336. Tightening the star wheel 328 moves drag shaft 352 axially outward. As shown in FIG. 18, the drag shaft 352 has a radially outward circumferential protrusion 370 at its axially inward end. The pair of Belleville washers 334 is disposed against the protrusion 370.

When tightening the star wheel 328, the star wheel 328 pulls the drag shaft 352 axially outward so that the drag shaft 352 compresses the Belleville washers 334, which in turn compress the drag stack 340. The main gear 346 also bears on the spacer washer 348 that bears on the spacer 350, which in turn, bears on an inner shoulder 358 of the clutch sleeve/gear stud 336 (see FIG. 17). Therefore, loosening and tightening the star wheel 328 adjusts the drag force from the drag stack 340, even when the clutch sleeve is under rotational load, because loosening and tightening the star wheel 328 adjusts the axial position of the drag shaft 352. In other words, the drag adjuster transmits drag adjustments from the star wheel 328 to the drag stack 340 and displaces relative to the clutch sleeve/gear stud 336 to adjust compression of the drag stack 340.

Put another way, the inward side force is applied by the drag shaft 352 (which is keyed to the clutch sleeve/gear stud 336), and the outward force is applied by the clutch sleeve/gear stud 336. As a result of compression of the drag stack 340, the drag shaft 352 axially displaces relative to the clutch sleeve/gear stud 336 when drag is applied. The torque from the drag stack 340 is transmitted directly to the clutch sleeve/gear stud 336. And because no torque is transmitted between the drag shaft 352 and the clutch sleeve/gear stud 336, the drag shaft 352 can freely axially displace relative to the clutch sleeve/gear stud 336, which is axially fixed. Therefore, upon a drag-reducing adjustment on the star wheel 328, the drag adjuster axially displaces relative to the clutch sleeve/gear stud 336 to reduce compression of the drag stack 340, and thus, reduce drag, even while tension is applied to the line.

Examples of a material for the reel frame and side plates for embodiments of the present invention include graphite-reinforced nylon and die-cast aluminum. Additionally, hardened stainless steel, bearing grade stainless steel, or 440C stainless steel are examples of a material for a clutch sleeve or gear stud/clutch sleeve in embodiments of the present invention. Further, type 301 hardened stainless steel is an example of a material for Belleville washers in embodiments of the present invention.

Each of the embodiments of the present invention provides a reel in which drag force can be incrementally reduced even under load. Additionally, each of the embodiments of the present invention provides a reel in which a drag adjuster transmits drag adjustments from an adjustment member to a drag stack without axially displacing a clutch sleeve. Further, each of the embodiments of the present invention provides a reel in which a drag adjuster transmits drag adjustments from the adjustment member to the drag stack and displaces relative to the clutch sleeve to adjust compression of the drag stack. Moreover, each of the embodiments of the present invention provides a reel including a drag adjuster that, upon a drag-reducing adjustment on the adjustment member, axially displaces relative to the clutch sleeve to reduce compression of the drag stack while tension is applied to the line.

Although only a few embodiments of the present invention have been shown and described, the present invention is not limited to the described embodiments. Instead, it will be appreciated by those skilled in the art that changes may be made to these embodiments without departing from the principles and spirit of the invention, the scope of which is defined by the appended claims and their equivalents.

What is claimed is:

1. A fishing reel, comprising:
a housing, including a side plate;
a gear stud rotatably disposed relative to the housing to rotate about a first axis;
a main gear concentrically disposed relative to the gear stud, the main gear interacting with another gear to rotate a spool about a second axis;
a drag stack concentrically disposed relative to the gear stud;
a one way clutch concentrically disposed relative to the gear stud;
a clutch sleeve disposed within and engaging the one-way clutch, the clutch sleeve being constrained to rotate with the gear stud;
an adjustment member disposed outside the housing that provides a user interface for adjusting a desired drag;
a drag adjuster that transmits drag adjustments from the adjustment member to the drag stack without axially displacing the clutch sleeve;
wherein the clutch sleeve is substantially axially fixed relative to the side plate.

2. The fishing reel according to claim 1, wherein the drag stack comprises at least one metal drag washer constrained to rotate with the gear stud and at least one fiber drag washer constrained to rotate with the main gear.

3. The fishing reel according to claim 1, wherein the gear stud is threaded into the adjustment member, the gear stud is axially displaceable relative to the clutch sleeve, and the drag adjuster comprises a shoulder disposed at an axially inner end of the gear stud for transmitting axial force from the adjustment member to the drag stack.

4. The fishing reel according to claim 3 further comprising:
a bearing;
a retaining ring; and
a retaining clip;
wherein the retaining ring retains the bearing against the side plate, and the retaining clip retains the clutch sleeve against the bearing, thereby substantially preventing displacement of the clutch sleeve relative to the side plate.

5. The fishing reel according to claim 3, wherein the drag stack comprises at least one metal drag washer constrained to rotate with the clutch sleeve and at least one fiber drag washer constrained to rotate with the main gear.

6. The fishing reel according to claim 5, wherein to increase drag, a user tightens the adjustment member, which displaces the gear stud axially outward, the displacement of which displaces the main gear axially outward, which compresses the drag stack.

\* \* \* \* \*